United States Patent
Fey (10) Patent No.: US 11,002,206 B2
(45) Date of Patent: May 11, 2021

(54) METHOD FOR ASCERTAINING A MAXIMUM STORAGE CAPACITY OF AN EXHAUST GAS COMPONENT RESERVOIR OF A CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/723,146

(22) Filed: Dec. 20, 2019

(65) Prior Publication Data

US 2020/0347792 A1 Nov. 5, 2020

(30) Foreign Application Priority Data

Dec. 27, 2018 (DE) .......................... 102018251720.7

(51) Int. Cl.
*F02D 41/02* (2006.01)
*F01N 11/00* (2006.01)
*F02D 41/04* (2006.01)

(52) U.S. Cl.
CPC .......... *F02D 41/0295* (2013.01); *F01N 11/00* (2013.01); *F02D 41/04* (2013.01); *F02D 2200/0802* (2013.01); *F02D 2200/0814* (2013.01)

(58) Field of Classification Search
CPC . F01N 11/00; F01N 3/10; F01N 9/005; F01N 2430/06; F01N 2560/025; F01N 2570/16; F01N 2900/08; F01N 2900/1411; F01N 2900/1602; F01N 2900/1624; F01N 3/0814; F01N 3/0864; F01N 3/0871; F01N 3/101; F02D 41/024; F02D 41/0295; F02D 41/04; F02D 41/123; F02D 41/14; F02D 41/1445; F02D 41/1446; F02D 41/18; F02D 2041/1433; F02D 2200/0404; F02D 2200/0802; F02D 2200/0814; F02D 2200/0816

See application file for complete search history.

(56) References Cited

U.S. PATENT DOCUMENTS

| | | | | |
|---|---|---|---|---|
| 2007/0277503 | A1* | 12/2007 | Odendall | F02D 41/1447 60/274 |
| 2008/0087259 | A1* | 4/2008 | Kato | F02D 41/1441 123/672 |
| 2009/0288391 | A1* | 11/2009 | Aoki | F01N 11/007 60/273 |

FOREIGN PATENT DOCUMENTS

DE 19606652 A1 8/1997

OTHER PUBLICATIONS

Kraftfahrtechnisches Taschenbuch [Automotive Handbook], 23rd edition, p. 524.

* cited by examiner

*Primary Examiner* — Brandon D Lee
(74) *Attorney, Agent, or Firm* — Norton Rose Fulbright US LLP; Gerard Messina (57) ABSTRACT

A method and a control device for regulating a modeled fill level of an exhaust gas component reservoir of a catalytic converter of an internal combustion engine. Regulation of the modeled fill level is accomplished using a system model. An actual maximum storage capacity of the catalytic converter for the exhaust gas component is ascertained during operation of the internal combustion engine and is taken into consideration in regulating the modeled fill level.

16 Claims, 4 Drawing Sheets

METHOD FOR ASCERTAINING A MAXIMUM STORAGE CAPACITY OF AN EXHAUST GAS COMPONENT RESERVOIR OF A CATALYTIC CONVERTER

CROSS REFERENCE

The present application claims the benefit under 35 U.S.C. § 119 of German Patent Application No. DE 102018251720.7 filed on Dec. 27, 2018, which is expressly incorporated herein by reference in its entirety.

FIELD

The present invention relates to a method for regulating a modeled fill level of an exhaust gas component reservoir of a catalytic converter of an internal combustion engine. In its apparatus-related aspects, the present invention relates to a control device.

BACKGROUND INFORMATION

Conventional methods and control devices for ascertaining oxygen constituting an exhaust gas component are available in the related art. German Patent No. DE 196 06 652 B4 describes modeling, by calculation, of an average fill level that is not directly measurable.

When the air-fuel mixture in an Otto-cycle engine burns incompletely, in addition to nitrogen ($N_2$), carbon dioxide ($CO_2$), and water ($H_2O$), a plurality of combustion products are emitted of which hydrocarbons (HC), carbon monoxide (CO), and nitrogen oxides ($NO_x$) are limited by statute. Given the present-day existing art, current limit exhaust values for motor vehicles can be met only with catalytic post-treatment of exhaust gases.

The aforesaid pollutant components can be converted using a three-way catalytic converter.

In three-way catalytic converters, a simultaneously high conversion rate for HC, CO, and $NO_x$ is achieved only in a narrow lambda range (called the "conversion window") around the stoichiometric operating point (lambda=1).

A lambda regulation system that is based on the signals of lambda probes disposed before and after the three-way catalytic converter is typically used in present-day engine control systems to operate the three-way catalytic converter in the conversion window. In order to regulate the excess-air factor (lambda), which is an indicator of the composition of the air/fuel ratio of the internal combustion engine, the oxygen content of the exhaust gas before the three-way catalytic converter is measured using an input-side exhaust-gas probe disposed there. Depending on that measured value, the regulation system corrects the fuel quantity or injection pulse width, which is defined in the form of a baseline value by a mixture pilot control function.

In the context of mixture pilot control, baseline values of fuel quantities to be injected are defined as a function of, for instance, the engine speed and load of the internal combustion engine. For even more accurate regulation, the oxygen concentration of the exhaust gas downstream from the three-way catalytic converter is additionally detected using a further exhaust-gas probe. The signal of this output-side exhaust-gas probe is used for a master control function that is overlaid on the lambda regulation, based on the signal of the input-side exhaust-gas probe, before the three-way catalytic converter. The exhaust-gas probe disposed after the three-way catalytic converter generally is a step-change lambda probe that possesses a very steep characteristic curve at lambda=1 and can therefore indicate lambda=1 very accurately (Kraftfahrtechnisches Taschenbuch [Automotive Handbook], 23rd edition, page 524).

In addition to a master control system, which generally controls out only small deviations from lambda=1 and is designed to be comparatively slow, current engine control systems usually contain a functionality in the form of a lambda pilot control system that, after large deviations from lambda=1, ensures that operation quickly returns to the conversion window; this is important, for instance, after coasting shutoff phases in which the three-way catalytic converter becomes loaded with oxygen. Oxygen loading is detrimental to $NO_x$ conversion.

Because of the oxygen storage capacity of the three-way catalytic converter, lambda=1 can still exist after the three-way catalytic converter for several seconds after a rich or lean lambda has been established before the three-way catalytic converter. This ability of the three-way catalytic converter to temporarily store oxygen is utilized in order to compensate for brief deviations from lambda=1 before the three-way catalytic converter. If a lambda not equal to 1 exists before the three-way catalytic converter for a longer period, the same lambda will also become established after the three-way catalytic converter as soon as the oxygen fill level at a lambda>1 (oxygen excess) exceeds the oxygen storage capacity or, at a lambda<1, as soon as no further oxygen is being stored in the three-way catalytic converter.

At this point in time a step-change lambda probe after the three-way catalytic converter then also indicates a departure from the conversion window. Until that point in time, however, the signal of the lambda probe after the three-way catalytic converter does not indicate the imminent breakout, and a master control function based on that signal therefore often reacts only with so much delay that the fuel metering system can no longer react in time prior to a breakout. Elevated tailpipe emissions occur as a result. Present-day regulation concepts therefore have the disadvantage that they react only with a delay to a departure from the conversion window based on the voltage of the step-change lambda probe after the three-way catalytic converter.

An alternative or supplement to regulation based on the signal of a lambda probe after the three-way catalytic converter is regulation of the average oxygen fill level of the three-way catalytic converter. This average fill level is not directly measurable, but, according to German Patent No. DE 196 06 652 B4 mentioned above, can be modeled by calculation.

A three-way catalytic converter is, however, a complex, nonlinear system having time-variant system parameters. The measured or modeled input variables for a model of the three-way catalytic converter are furthermore usually affected by uncertainties.

SUMMARY

The present invention provides that an actual maximum storage capacity of the catalytic converter for the exhaust gas component is ascertained during operation of the internal combustion engine and is taken into consideration in regulating the modeled fill level.

The example control device is configured to execute such a method.

The present invention brings about a determination of the actual maximum storage capacity of the catalytic converter for the exhaust gas component, with which inaccuracies of measured or modeled variables that are involved in the system model, and uncertainties in the system model, are compensated for.

Model-based regulation of the fill level of a catalytic converter has the advantage, in principle, that an imminent departure from the catalytic converter window can be recognized earlier on than in the case of a master control system that is based on the signal of an exhaust gas probe disposed downstream from the catalytic converter. The departure from the catalytic converter window can thereby be counteracted by a prompt and controlled correction of the air/fuel mixture.

The robustness of the model-based regulation system can be improved by the determination according to the present invention of the maximum fill. Emissions can thereby be further reduced. Stricter regulatory requirements can be complied with, at less cost for the catalytic converter. This results in a further improvement in model-based regulation of the fill level of a catalytic converter, with which a departure from the catalytic converter window can be promptly recognized and prevented.

A preferred embodiment provides that an actual maximum storage capacity of the catalytic converter for the exhaust gas component is measured under predetermined operating conditions under which a reliable measurement result is to be expected.

It is further preferred that the exhaust gas component be oxygen.

It is also preferred that the determined operating state follow a coasting phase with fuel shutoff; and that the determined operating state be an operating state in which an oxygen fill in the exhaust gas component reservoir which occurred in the coasting phase is cleared by an input of exhaust gas that exhibits an oxygen deficiency.

It is further preferred that the determined operating state be an operating state in which operating parameters with which an adaptive characteristics-diagram memory of a control device controlling the internal combustion engine is addressable are limited to predetermined change ranges that in turn are associated with predetermined values of the modeled maximum fill level.

A further preferred embodiment of the present invention provides that the operating parameters are an average catalytic converter temperature and an exhaust gas mass flow.

A further preferred embodiment proof the present invention provides that an expected oxygen discharge from the exhaust gas component reservoir from the beginning of clearance until attainment of a setpoint for the exhaust gas component reservoir fill, and an oxygen discharge from the beginning of clearance until a reaction by an exhaust gas probe disposed in the exhaust gas flow downstream from the catalytic converter, are determined, the two values being correlated, and an indicator of the adaptation requirement of the modeled maximum storage capacity in that operating state being determined from the correlation.

It is also preferred that the indicator of the adaptation requirement be determined as twice the modeled maximum oxygen storage capacity if the oxygen discharge until the signal of the lambda probe after the catalytic converter changes from lean to lambda=1 is twice as high as the expected oxygen discharge until the modeled fill level reaches the steady-state setpoint.

It is further preferred that the indicator of the adaptation requirement be determined as half the modeled maximum oxygen storage capacity if the oxygen discharge until the signal of the lambda probe after the catalytic converter changes from lean to lambda=1 is half as high as the expected oxygen discharge until the modeled fill level would reach the steady-state setpoint.

A further preferred embodiment of the present invention provides that the adaptation requirement is a value, stored in a characteristics diagram for a determined operating point that is defined by associated change ranges of operating parameters, for the maximum modeled oxygen fill level of the catalytic converter; and that that value is overwritten by a new value for that operating point when the new value has been ascertained.

It is also preferred that the determined operating state be a coasting phase with fuel shutoff, during which a filling of the exhaust gas component reservoir occurs by admission of oxygen.

With reference to the apparatus aspects, it is preferred that the control device be configured to carry out one of the aforementioned embodiments of the method.

Further advantages are evident from the description and from the figures.

It is understood that the features recited above and those yet to be explained below are usable not only in the respective combination indicated, but also in other combinations or in isolation, without departing from the scope of the present invention.

Exemplifying embodiments of the present invention are depicted in the figures and are explained in further detail below.

Reference characters that are the same in different Figures refer in each case to elements that are the same or at least comparable in terms of their function.

DETAILED DESCRIPTION OF EXAMPLE EMBODIMENTS

The present invention is described below using the example of a three-way catalytic converter and for oxygen as an exhaust gas component that is to be stored. The present invention is also transferrable, however, to other catalytic converter types and other exhaust gas components, such as nitrogen oxides and hydrocarbons. In the interest of simplicity, the basis for discussion hereinafter will be an exhaust system having a three-way catalytic converter. The present invention is also transferrable analogously to exhaust systems having several catalytic converters. In that case the front and rear zones described below can extend over several catalytic converters or can be located in different catalytic converters.

Figure 1:
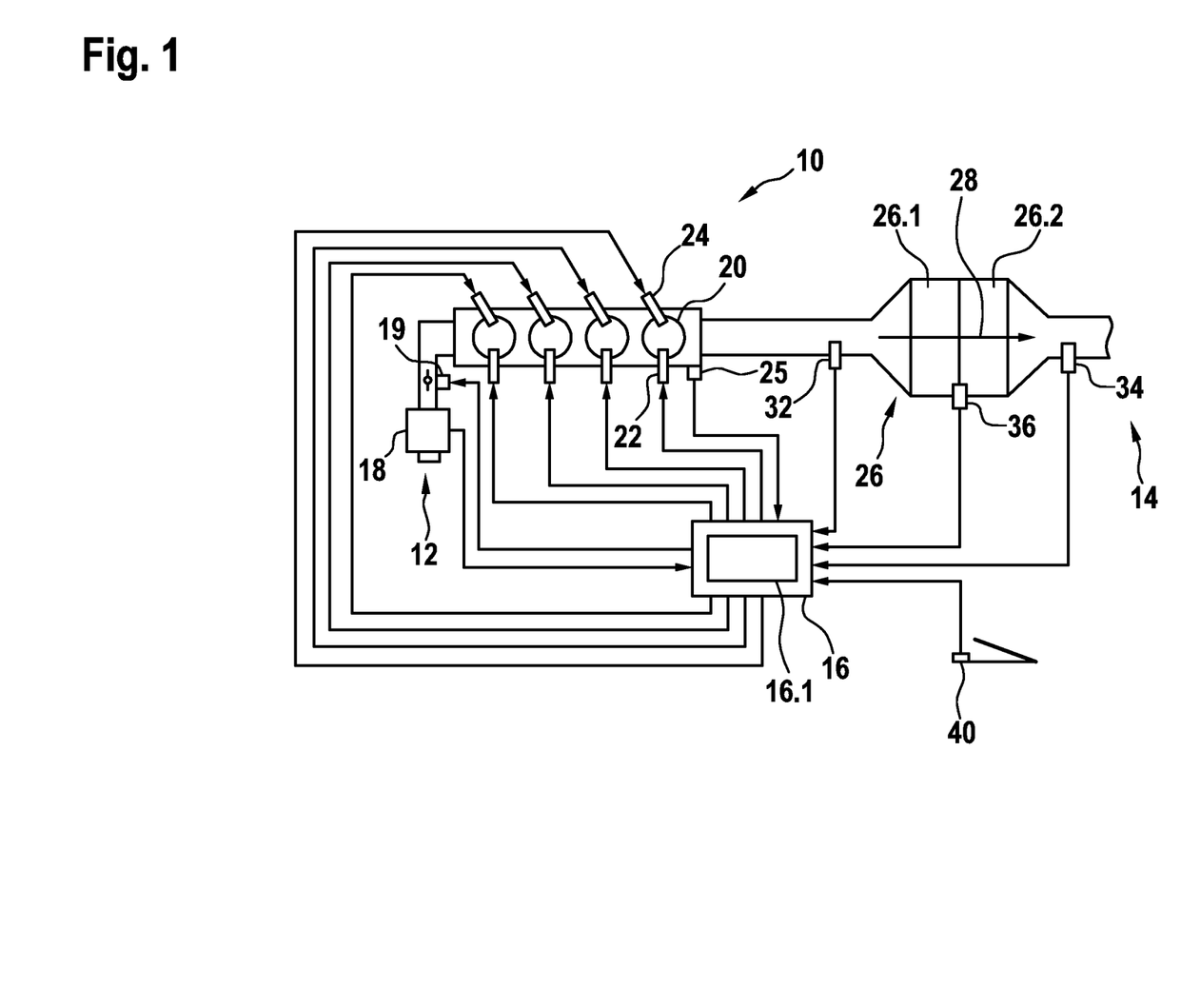
FIG. 1 depicts an internal combustion engine having an air delivery system, an exhaust system, and a control device.

FIG. 1 specifically shows an internal combustion engine 10 having an air delivery system 12, having an exhaust system 14, and having a control device 16. Located in air delivery system 12 are an air mass sensor 18 and a throttle valve, disposed downstream from air mass sensor 18, of a throttle valve unit 19. Air flowing via air delivery system 12 into internal combustion engine 10 is mixed, in combustion chambers 20 of internal combustion engine 10, with fuel that is injected via injection valves 22 directly into combustion chambers 20. The invention is not limited to internal combustion engines having direct injection, and can also be used with intake manifold injection or in internal combustion engines operated with gas. The resulting combustion chamber charges are ignited with ignition apparatuses 24, for example spark plugs, and combusted. A rotation angle sensor 25 detects a rotation angle of a shaft of internal combustion engine 10 and thereby allows control device 16 to initiate the ignition events at predetermined angular positions of the shaft. The exhaust gas resulting from the combustion events is discharged through exhaust system 14.

Exhaust system 14 has a catalytic converter 26. Catalytic converter 26 is, for instance, a three-way catalytic converter that, in conventional fashion, converts three exhaust gas constituents (nitrogen oxides, hydrocarbons, and carbon monoxide) along three reaction pathways and has an oxygen-storing effect. Because of the oxygen-storing effect and because oxygen is an exhaust gas constituent, the catalytic converter possesses an exhaust gas component reservoir. In the example depicted, three-way catalytic converter 26 has a first zone 26.1 and a second zone 26.2. Exhaust gas 28 flows through both zones. The first, front zone 26.1 extends in a flow direction over a front region of three-way catalytic converter 26. The second, rear zone 26.2 extends downstream from first zone 26.1 over a rear region of three-way catalytic converter 26. Further zones, for which the respective fill level can likewise be modeled with a calculation model, can of course be located before front zone 26.1 and after rear zone 26.2, and between the two zones.

Upstream from three-way catalytic converter 26, an input-side exhaust gas probe 32, exposed to exhaust gas 28, is disposed immediately before three-way catalytic converter 26. Downstream from three-way catalytic converter 26, an output-side exhaust gas probe 34 likewise exposed to exhaust gas 28 is disposed immediately after three-way catalytic converter 26. Input-side exhaust gas probe 32 is preferably a broadband lambda probe that permits a measurement of the excess-air factor $\lambda$ over a wide excess-air factor range. Output-side exhaust gas probe 34 is preferably a so-called step-change lambda probe with which the excess-air factor $\lambda=1$ can be measured particularly accurately, since the signal of this exhaust gas probe 34 changes abruptly at that point (see Bosch, Kraftfahrtechnisches Taschenbuch [Automotive Handbook], 23rd edition, page 524).

In the exemplifying embodiment depicted, a temperature sensor 36 exposed to exhaust gas 28 is disposed on three-way catalytic converter 26 in thermal contact with exhaust gas 28, and detects the temperature of three-way catalytic converter 26.

Control device 16 processes the signals of air mass sensor 18, of rotation angle sensor 25, of input-side exhaust probe 32, of output-side exhaust probe 34, and of temperature sensor 36, and from them creates control application signals for setting the angular position of the throttle valve, for initiating ignition by ignition apparatus 24, and for injection of fuel by injection valves 22. Alternatively or additionally, control device 16 also processes signals of other or further sensors in order to activate the actuating members depicted or also further or other actuating members, for instance the signal of a driver's-input transducer 40 that detects an accelerator pedal position. A coasting mode with shutoff of fuel delivery is initiated, for instance, by release of the accelerator pedal. These functions, and further ones also explained below, are performed by an engine control program 16.1 that executes in control device 16 during the operation of internal combustion engine 10.

Herein, reference is made to a system model 100, a catalytic converter model 102, an output lambda model 106 (see FIG. 2), and an inverse catalytic converter model. The models are in each case algorithms, in particular systems of equations, that are executed or calculated in control device 16 and that combine input variables, which also act on the real object simulated by the calculation model, to produce output variables in such a way that the output variables calculated using the algorithms correspond as accurately as possible to the output variables of the real object.

Figure 2:
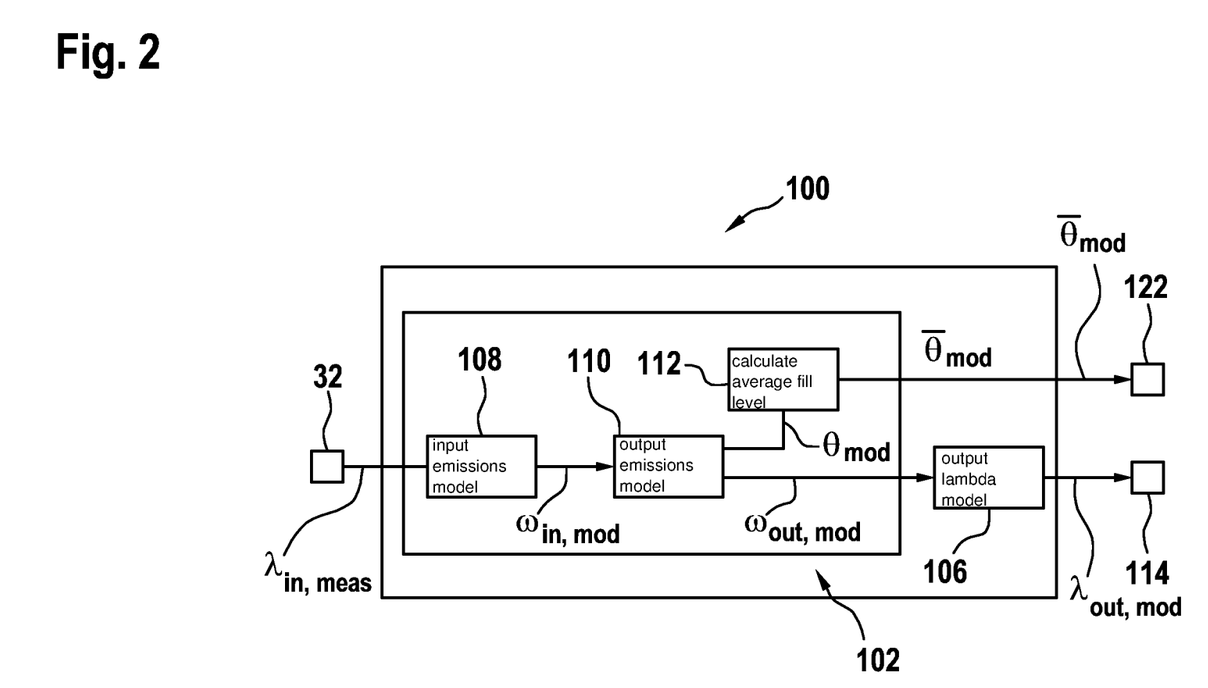
FIG. 2 is a functional block depiction of a system model.

FIG. 2 is a functional block depiction of a system model 100. System model 100 is made up of catalytic converter model 102 and output lambda model 106. Catalytic converter model 102 encompasses an input emissions model 108 and a fill level and output emissions model 110. Catalytic converter model 102 furthermore encompasses an algorithm 112 for calculating an average fill level $\bar{\theta}_{mod}$ of catalytic converter 26.

Input emissions model 108 is configured to convert the signal $\lambda_{in,meas}$ of exhaust gas probe 32 disposed before three-way catalytic converter 26, constituting an input variable, into input variables $w_{in,mod}$ required for the subsequent fill level and output emissions model 110. For example, a conversion of lambda into the concentrations of $O_2$, $CO$, $H_2$, and HC before three-way catalytic converter 26 using input emissions model 108 is advantageous.

With the variables $w_{in,mod}$ calculated by input emissions model 108, and optionally additional input variables (e.g. exhaust-gas or catalytic-converter temperatures, exhaust gas mass flow, and current maximum oxygen storage capacity of three-way catalytic converter 26), a fill level $\theta_{mod}$ of three-way catalytic converter 26 and concentrations $w_{out,mod}$ of the individual exhaust gas components at the output of three-way catalytic converter 26 are modeled in fill level and output emissions model 110.

In order to allow filling and emptying processes to be represented more realistically, three-way catalytic converter 26 is preferably notionally subdivided by the algorithm into several zones or sub-volumes 26.1, 26.2 located one behind another in the flow direction of exhaust gases 28, and the concentrations of the individual exhaust gas constituents are ascertained with the aid of the reaction kinetics for each of these zones 26.1, 26.2. These concentrations can in turn each be converted into a fill level of the individual zones 26.1, 26.2, preferably into the oxygen fill level normalized to the current maximum oxygen storage capacity.

The fill levels of individual, or all, zones 26.1, 26.2 can be combined by suitable weighting into an overall fill level that reflects the state of three-way catalytic converter 26. For instance, in the simplest case the fill levels of all zones 26.1, 26.2 can all be weighted identically, and an average fill level can thereby be ascertained. With suitable weighting, however, it is also possible to take into consideration the fact that for the instantaneous exhaust gas composition after three-way catalytic converter 26, the fill level in a comparatively small zone 26.2 at the output of three-way catalytic converter 26 is critical, whereas for the development of the fill level in that small zone 26.2 at the output of three-way catalytic converter 26, the fill level in zone 26.1 located before it, and the development thereof, are critical. In the interest of simplicity, an average oxygen fill level will be assumed hereinafter.

The algorithm of output lambda model 106 converts the concentrations $w_{out,mod}$ of the individual exhaust gas components at the output of catalytic converter 26 which were calculated with catalytic converter model 102, for adaptation of system model 100, into a signal $\lambda_{out,mod}$ that can be compared with the signal $\lambda_{out,meas}$ of exhaust gas probe 34 disposed after catalytic converter 26. Preferably, the lambda after three-way catalytic converter 26 is modeled. Output lambda model 106 is not mandatorily necessary for pilot control on the basis of a target oxygen fill level.

System model 100 thus serves on the one hand to model at least one average fill level $\overline{\theta}_{mod}$ of catalytic converter 26 which is regulated to a target fill level at which catalytic converter 26 is definitely within the catalytic converter window (and thus can both receive and discharge oxygen). On the other hand, system model 100 makes available a modeled signal $\lambda_{out,mod}$ of exhaust gas probe 34 disposed after catalytic converter 26. A further, more detailed explanation will be given below as to how this modeled signal $\lambda_{out,mod}$ of output-side exhaust gas probe 34 is advantageously used for the adaptation of system model 100. Adaptation is performed in order to compensate for uncertainties that affect the input variables of the system model, in particular the signal of the lambda probe before the catalytic converter. The pilot control system is also adapted.

Figure 3:
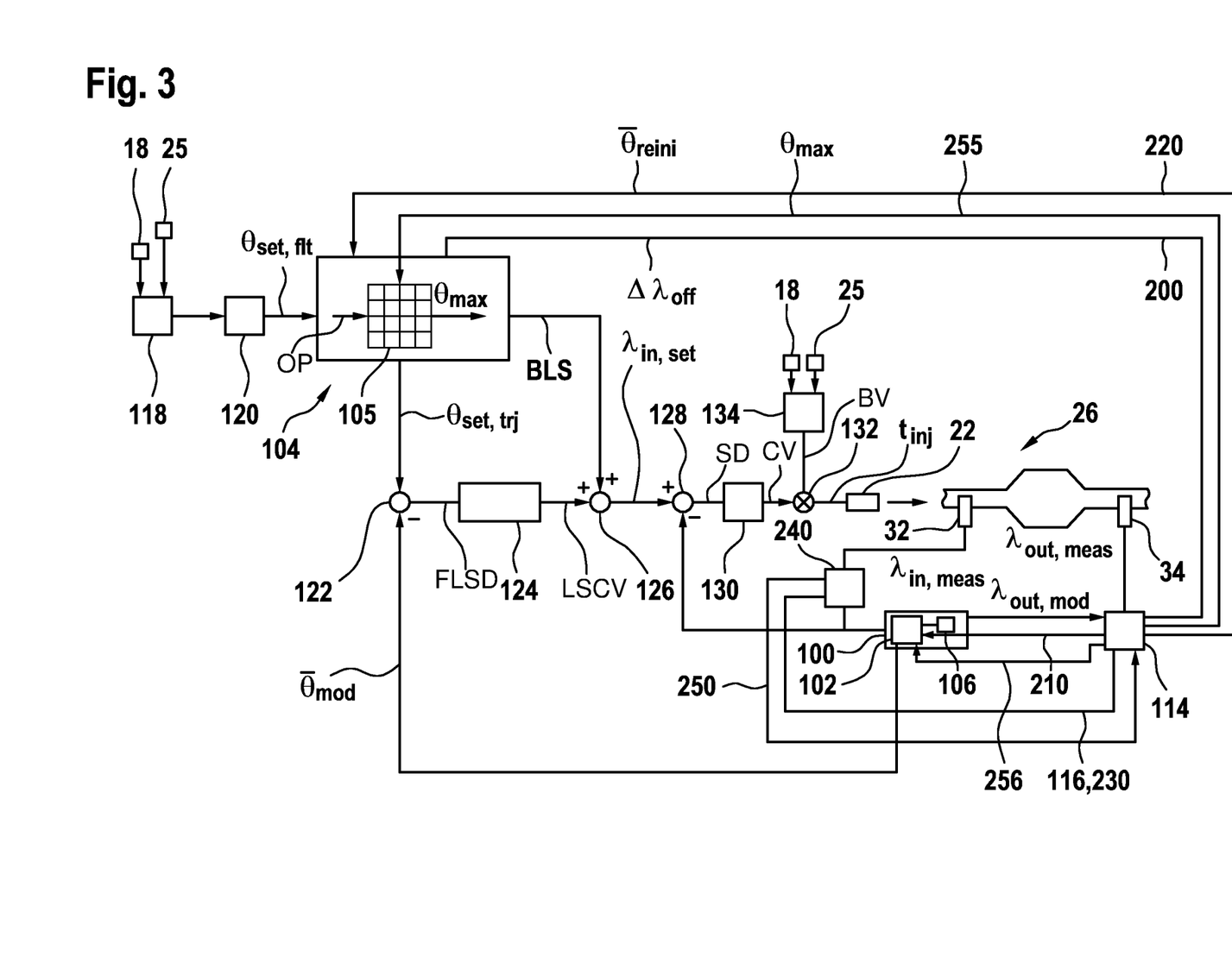
FIG. 3 is a functional block depiction with which both method aspects and apparatus aspects of the invention are illustrated.

FIG. 3 is a functional block depiction that illustrates both method aspects and apparatus aspects of the invention. Specifically, FIG. 3 shows that the signal $\lambda_{out,mod}$ of output-side exhaust gas probe 34 modeled by output lambda model 106, and the real output signal $\lambda_{out,meas}$ of output-side lambda probe 34, are delivered to an adaptation block 114. Adaptation block 114 compares the two signals $\lambda_{out,mod}$ and $\lambda_{out,meas}$ with one another. For example, a step-change lambda probe, constituting exhaust gas probe 34, which is disposed after three-way catalytic converter 26 indicates unequivocally when three-way catalytic converter 26 is completely filled with oxygen or has been completely emptied of oxygen.

This can be used, after lean or rich phases, to bring the modeled oxygen fill level into agreement with the actual oxygen fill level, or to bring the modeled output lambda $\lambda_{out,mod}$ into agreement with the lambda $\lambda_{out,meas}$ measured after three-way catalytic converter 26, and to adapt system model 100 in the event of deviations.

A first adaptation path 220 proceeding from adaptation block 114 leads to pilot control system 104. By way of this adaptation path 220, the modeled fill level used in the inverse catalytic converter model of pilot control system 104 is adjusted to the real fill level. This corresponds to a discontinuous correction (or reinitialization) of the modeled fill level in pilot control system 104.

A second adaptation path 210 proceeding from adaptation block 114 leads to system model 100. By way of second adaptation path 210, the modeled fill level used in system model 100 is adjusted to the real fill level. This corresponds to a discontinuous correction (or reinitialization) of the modeled fill level in system model 100.

The two discontinuous correction actions are preferably always performed together, i.e. simultaneously, since the pilot control system is designed as an inversion of the system model. Otherwise inconsistencies would occur in the modeled fill levels in the two functional blocks of system model 100 and pilot control system 104.

These actions constitute a first adaptation stage. These discontinuously occurring adaptation operations are based on large and small (but not average) signal values of output-side exhaust gas probe 34.

A third adaptation path 200 proceeding from adaptation block 114 leads to pilot control system 104. What occurs by way of third adaptation path 200 is a continuous adaptation that is based on average signal values of output-side exhaust gas probe 34. With these average signal values, the signal of output-side exhaust gas probe 34 accurately indicates the lambda value of the exhaust gas. If an offset $\Delta\lambda_{offs}$ occurs in the lambda control loop, as can be the case due to a fault in input-side exhaust gas probe 32 or a leakage air input into the exhaust gas occurring between the two exhaust gas probes, the signal of output-side exhaust gas probe 34 lying in the average signal value region will indicate this offset $\Delta\lambda_{offs}$ as a deviation from an expected value. The deviation is ascertained in block 114, for instance, as a difference between signal value and expected value, and is additively calculated into the lambda setpoint in pilot control system 104. This can be accomplished, for instance, by the fact that the lambda offset value $\Delta\lambda_{offs}$ is added to a provisional pilot-control lambda value.

In an embodiment, as an option a fourth adaptation path 230 is also present. The fourth adaptation path leads from adaptation block 114 to a block 240 in which an actual lambda value of input-side lambda probe 32 is additively combined with the lambda offset value.

Ascertainment according to the present invention of the actual maximum storage capacity of the catalytic converter is effected, for instance, in block 114. In the exemplifying embodiment of FIG. 3, ascertained values for the actual maximum storage capacity $\theta_{max}$ are conveyed, in the exemplifying embodiment of FIG. 3, via a path 255 to pilot control system 104, where they are stored as a function of operating point in an adaptive characteristics diagram 105 and taken into consideration when regulating the modeled fill level. In a preferred embodiment, the actual maximum oxygen storage capacity $\theta_{max}$ is also taken into consideration in system model 100; this is illustrated in FIG. 3 by an adaptation path 256 by way of which the actual maximum storage capacity ascertained in block 114 is transferred to system model 100.

The actual maximum storage capacity $\theta_{max}$ is taken into consideration in pilot control system 104 in parallel with consideration in system model 100, since pilot control system 104 is designed as an inversion of system model 100. Otherwise, inconsistencies in the modeled fill levels would occur in the two functional blocks of system model 100 and of pilot control system 104.

Adaptive characteristics diagram 105 could optionally also be located as a separate block outside pilot control system 104 and system model 100, and could feed into both blocks 104 and 100.

The operating points, or ranges of operating points, are defined, e.g., by values of operating parameters OP on which the storage capacity depends. Examples of such operating parameters are the catalytic converter temperature and the exhaust gas mass flow. The values of operating parameters can be individual values or ranges of values. Operating-point-dependent storage is effected, for instance, in an adaptive characteristics diagram 105 that is addressed with operating parameters OP. Values for these operating parameters are available in modern engine control devices.

An exemplifying embodiment of ascertainment according to the present invention of the actual maximum oxygen storage capacity of catalytic converter 26 will be explained below with reference to FIGS. 4, 5, and 6.

Inaccuracies in the modeled maximum oxygen storage capacity become evident especially when catalytic converter 26 has departed from the catalytic converter window and needs to be brought back into it with minimal emissions. Such is the case, for instance, after an extended fuel shutoff during coasting. Catalytic converter 26 is then completely filled with oxygen. The task of fill level pilot control system 104 and of the fill level regulation system is to return as quickly as possible to the steady-state setpoint for the oxygen fill level, which can be, for instance, a relative fill level of 30% in terms of the actual maximum oxygen storage capacity, while avoiding an undershoot of the fill level. If the catalytic converter is not cleared quickly enough after a fuel shutoff phase, elevated $NO_x$ emissions occur. Conversely, if the catalytic converter is cleared too much after a fuel shutoff phase, so that an undershoot of the fill level occurs, elevated CO and HC emissions occur.

Fill level pilot control system 104 therefore takes into consideration the maximum oxygen storage capacity in the context of catalytic converter clearance. Fill level pilot control system 104 calculates a setpoint trajectory $\theta_{set,trj}$ with which a fill level that is too high after fuel shutoff (corresponding, for a sufficiently long coasting shutoff phase, to the maximum oxygen storage capacity) can be brought as quickly as possible back to the steady-state setpoint for the fill level.

Using the setpoint trajectory $\theta_{set,trj}$, fill level pilot control system 104 takes into consideration which lambda values can in fact be implemented (e.g. the combustion limits of the engine, or the maximum enrichment or leaning desired under current operating conditions). Fill level regulation system 124 regulates the modeled fill level $\bar{\theta}_{mod}$ to the setpoint trajectory $\theta_{set,trj}$.

In the absence of inaccuracies in the modeled maximum storage capacity, the setpoint trajectory $\theta_{set,trj}$ and the modeled oxygen fill level $\bar{\theta}_{mod}$ would reach the steady-state setpoint exactly at the point in time at which the actual fill level of catalytic converter 26 also reaches the steady-state setpoint. The steady-state setpoint preferably has a value at which the signal of output-side exhaust gas probe 34 changes from a signal indicating an oxygen excess to a signal indicating a stoichiometric ratio or even an oxygen deficiency. A typical value for such a steady-state setpoint is 30% of the currently possible maximum fill. The goal is that, upon attainment of the steady-state setpoint, catalytic converter clearance is superseded by regular fill level regulation to the steady-state setpoint.

As a result of inaccuracies in the modeled maximum oxygen storage capacity, the latter can differ from the actual maximum oxygen storage capacity, as will be explained below with reference to FIGS. 4, 5, and 6.

Figure 4:
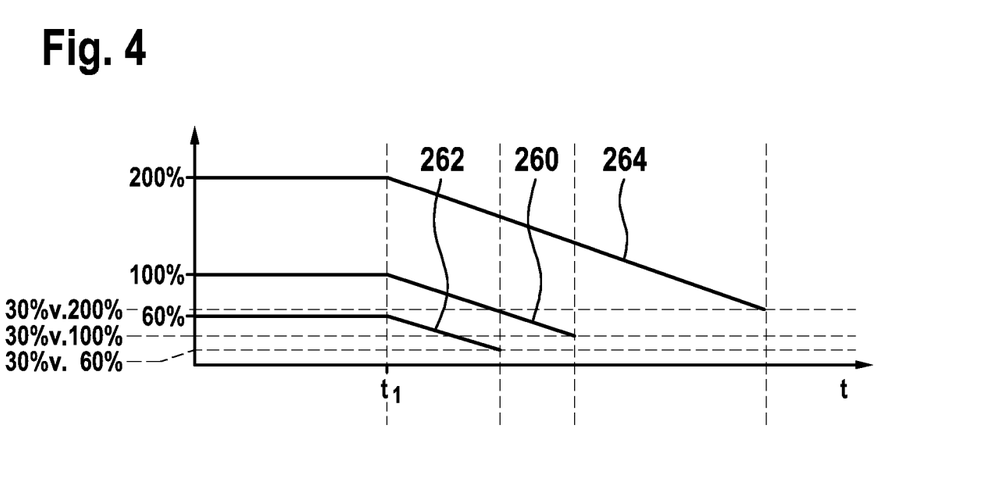
FIG. 4 shows three actual curves over time t for oxygen fill levels of a catalytic converter.

FIG. 4 shows three actual curves 260, 262, 264 for oxygen fill levels of a catalytic converter 26 over time t, the values each being referred to a modeled oxygen storage capacity of catalytic converter 26. The modeled oxygen storage capacity corresponds, by definition, to a value of 100%.

In the case of curve 260, the actual maximum oxygen storage capacity corresponds to a value of 100% of the modeled maximum oxygen storage capacity. In the case of curve 262, the actual maximum oxygen storage capacity corresponds to a value of only 60% of the modeled maximum oxygen storage capacity. In the case of curve 264, the actual maximum oxygen storage capacity corresponds to a value of 200% of the modeled maximum oxygen storage capacity.

Figure 5:
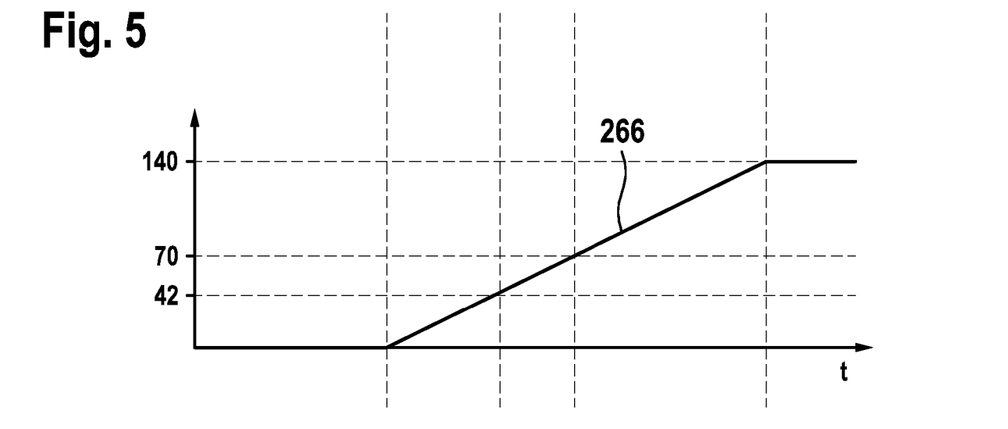
FIG. 5 shows a curve over time t for the total oxygen cleared from a catalytic converter after a fuel shutoff and after a resumption of fuel delivery.

FIG. 5 shows curve 266 for the total oxygen cleared from a catalytic converter 26 over time t for a situation in which the exhaust gas mass flow delivered to catalytic converter 26 exhibits an oxygen deficiency starting at a time t1, and previously had a maximum oxygen fill.

Figure 6:
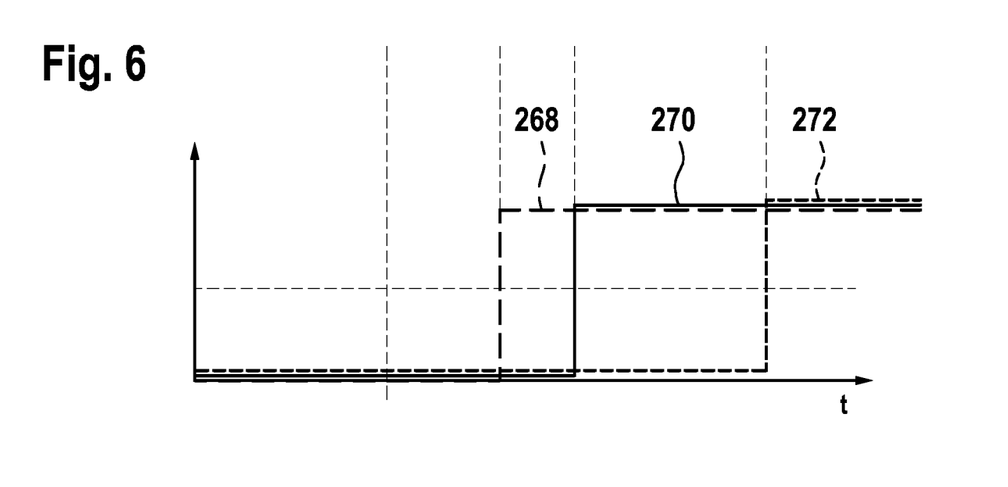
FIG. 6 shows time-related curves for signals of an output-side exhaust gas probe for time-related curves for oxygen fill levels that result from the curve of FIG. 5.

FIG. 6 shows curves 268, 270, 272 over time for signals of output-side exhaust gas probe 34 for the profiles over time of oxygen fill levels that result from the oxygen discharge of FIG. 5. The horizontal dashed line corresponds to a signal of exhaust gas probe 34 which indicates stoichiometry. The intersection point of the left vertical dashed line with the t axis separates a coasting operating phase with fuel shutoff, located to its left, from a catalytic converter clearance phase located to its right. Curve 268 in FIG. 6 pertains to curve 262 in FIG. 4. Curve 270 in FIG. 6 pertains to curve 260 in FIG. 4. Curve 272 in FIG. 6 pertains to curve 264 in FIG. 4.

The signal of output-side exhaust gas probe 34 changes from a low signal level indicating an oxygen excess to a middle signal level indicating stoichiometric conditions, or to a high signal level indicating an oxygen deficiency, each time catalytic converter 26 can no longer compensate, with stored oxygen, for an oxygen deficiency occurring on the input side. In the example depicted, this is the case whenever the actual fill level has reached a value of 30% of the actual maximum fill level. For curve 260, the value of 300 of 100% is located at 300. For curve 262, the 30% value is located, for 30% of 60%, at 18%. For curve 264, the 30% value is located, for 30% of 200%, at 60%.

If the actual maximum storage capacity (e.g. 200 units, corresponding to 200% in the case of curve 264) is greater than the modeled maximum storage capacity (e.g. 100 units, corresponding to 100%), clearance occurs, for instance, to a value of 30% of 100 units, i.e. to a modeled residual oxygen fill of 30 units. In order to reach this value starting from a modeled 100 units, 70 units are cleared. In fact, after clearance, 200 units minus 70 units=130 units, corresponding to 65% of 200 units, are then still present in catalytic converter 26. This value, which is too high measured against the steady-state setpoint of 30% (60 units), would result in suboptimally high $NO_x$ conversion.

If the actual maximum storage capacity (e.g. 60 units, corresponding to 60% in the case of curve 262) is less than the modeled maximum storage capacity (e.g. 100 units corresponding to 100%, curve 260), clearance occurs, for instance, to a value of 30% of 100 units, i.e. to a modeled residual oxygen fill of 30 units. In order to reach this value from the modeled 100 units, 70 units actually need to be cleared. The actual fill level would then be 60 units minus 70, equaling–10 units. Output-side exhaust gas probe 34 would already have reacted before that value is reached, and that reaction would trigger a termination of catalytic converter clearance. Even with such termination, however, insufficient filling of the catalytic converter with oxygen would still be established, and would result overall in suboptimally high CO and HC emissions.

To avoid this, the actual maximum oxygen storage capacity of the catalytic converter is sporadically measured under determined representative operating conditions at which a reliable measurement result can be expected.

For each clearance operation, the oxygen discharge, from the beginning of catalytic converter clearance until the output-side exhaust gas probe reacts from lean to lambda=1, supplies a current measured value for the maximum oxygen concentration without additional emissions.

In addition, the oxygen discharge expected in the context of the modeled maximum storage capacity for catalytic converter clearance, until attainment of the steady-state fill level setpoint, is compared with the oxygen discharge that occurs until a lambda probe after the catalytic converter indicates that the catalytic converter window has once again been reached. Arrival in the catalytic converter window is recognized when the signal of the lambda probe after the catalytic converter switches from lean to lambda=1 or to rich.

If the modeled maximum storage capacity (e.g. 100 units) is less than the actual capacity (e.g. 200 units), the modeled fill level reaches the steady-state setpoint (e.g. 30% of 100 units=30 units) when 70 units have been cleared. In actuality, 130 units of 200 units are still present before the signal of the lambda probe after the catalytic converter changes from lean to lambda=1.

In an embodiment of the invention, provision is made on the one hand to specify the expected oxygen discharge from the beginning of catalytic converter clearance until attainment of the steady-state setpoint, and on the other hand to specify the oxygen discharge from the beginning of catalytic converter clearance until the change in the signal of the lambda probe after the catalytic converter from lean to lambda=1; to correlate the two; and from the correlation to specify an indicator of the adaptation requirement of the modeled maximum storage capacity at that operating point.

An adaptation requirement exists whenever a new maximum modeled fill level, which deviates from a maximum modeled fill level previously valid for an operating point, is ascertained for the respective operating point.

The steady-state setpoint here is 30 units (30% of the modeled value (100 units)). The expected value for the oxygen discharge, proceeding from 100 units, is then 70 units. The actual discharge, proceeding from the actual value of 200 units down to 30% of that value (60 units), is 140 units. The actual discharge can be calculated by control device 16 from data present in control device 16. The ratio between the two variables is 140 units: 70 units=2. The two values are different. An adaptation requirement therefore exists. In an embodiment, the old value for the maximum modeled storage capacity of 100 units is overwritten by a new value, which here is equal to twice the old value.

If, conversely, the modeled maximum storage capacity (for instance, 100 units) is greater than the actual capacity (for instance, 60 units), the signal of the output-side exhaust gas probe 34 switches from lean to lambda=1 when the actual fill level reaches a value of 30% of the maximum actual fill level. That 30% corresponds, in the present example, to 18 units. This residual fill is reached, starting from 60 units, after clearance of 42 units. This residual fill is attained in particular before the modeled fill level reaches the steady-state setpoint (at 30 units, i.e. after discharge of 70 units). At this point in time the modeled fill level is still 58 units.

What is used in this case as the oxygen discharge from the beginning of catalytic converter clearance until the change in the signal of the output-side exhaust gas probe 34 from lean (oxygen excess) to lambda=1 (stoichiometry) is the difference between the modeled maximum storage capacity (here, 100 units) and the oxygen mass that corresponds to the modeled fill level (here, 58 units) at the time at which the signal of the lambda probe after the catalytic converter changes from lean to lambda=1 (100−58=42 units).

In this case as well, the expected oxygen discharge from the beginning of catalytic converter clearance until the modeled fill level reaches the steady-state setpoint again corresponds simply to the difference between the modeled maximum storage capacity (100 units) and the steady-state setpoint (30% of 100=30 units). This expected oxygen discharge (equal to 70 units) is correlated with the oxygen discharge until the signal of the lambda probe after the catalytic converter changes from lean to lambda=1 (here, 42 units) and, here as well, an indicator of the adaptation requirement of the modeled maximum storage capacity at that operating point is determined from the correlation.

In the example here, it is useful to multiply the modeled maximum oxygen storage capacity (here, 100 units) by the ratio between the oxygen discharge until the change in signal of the lambda probe after the catalytic converter from lean to lambda=1 (here, 42 units) and the expected oxygen discharge from the beginning of catalytic converter discharge until the modeled fill level reaches the steady-state setpoint (here, 70 units). In the present case this product has the value 100×42/70=60 units. In the example selected, this corresponds to the actual maximum oxygen storage capacity of 60 units, and is therefore useful.

If the oxygen discharge until the change in the signal of the lambda probe after the catalytic converter from lean to lambda=1 is half as great as the expected oxygen discharge until the modeled fill level would reach the steady-state setpoint, it is useful to divide the modeled maximum oxygen storage capacity by two (i.e. 100/2=50 units).

An adaptation requirement can also be determined analogously in the case of catalytic converter admission, in which the catalytic converter is firstly emptied of oxygen and is to be brought back into the catalytic converter window as quickly as possible by controlled oxygen introduction.

An adaptation requirement exists whenever a new maximum modeled fill level, which deviates from a maximum modeled fill level previously valid for an operating point, is ascertained for the respective operating point. In the case of a deviation, it is preferred that the previously valid maximum modeled fill level be overwritten by the maximum fill level just ascertained.

What is critical is that the adaptation requirement be detected and stored separately in each case for a determined operating point or class of similar operating points. A determined operating point, or a class of similar operating points, is defined by associated change ranges of operating parameters. For example, an operating point is defined by a determined catalytic converter temperature and a determined exhaust mass flow. The class of similar operating points is defined by a range of exhaust gas temperatures which includes the determined exhaust gas temperature and by a range of exhaust gas mass flows which includes the determined exhaust gas mass flow.

Storage occurs preferably in an adaptive characteristics diagram 105 that is saved in the nonvolatile memory of control device 16.

One possibility, for instance, is to span a characteristics diagram 105 across the average catalytic converter temperature and the exhaust gas mass flow. Other input variables for characteristics diagram 105 for which a dependence of the modeled maximum storage capacity on those variables exists are, however, also useful. A value for the maximum modeled oxygen fill level of the catalytic converter which is stored in the characteristics diagram for a determined operating point is overwritten by a new value for that operating point once the new value has been ascertained.

When the engine or the exhaust system is being operated in a determined range of catalytic converter temperature and exhaust gas mass flow, the adaptation requirement is detected and stored in the corresponding region of adaptive characteristics diagram 105. If an adaptation requirement was already stored in the corresponding region in characteristics diagram 105, typically a further adaptation requirement should not be necessary in that region. It is nevertheless advantageous to continue to detect the adaptation requirement even in such regions, and to compare the already stored adaptation requirement with the one just detected, and adapt it if necessary. Characteristics diagram 105 gradually becomes filled or updated with the corresponding adaptation requirement over the entire range of catalytic converter temperatures and exhaust gas mass flows.

The result is not only to improve the quality of catalytic converter clearance and catalytic converter admission, which are activated only when the catalytic converter has departed from the catalytic converter window, but also to improve the quality of ordinary regulation of the fill level of the catalytic converter within the catalytic converter window. An imminent departure from the catalytic converter window is recognized earlier, and emissions are reduced, because inaccuracies in the modeled maximum storage capacity are adapted. The adaptation requirement that is necessary is retrieved directly from characteristics diagram 105 and is therefore effective immediately. Emissions can thereby be further reduced.

In a preferred embodiment, adaptation of the modeled maximum oxygen storage capacities is supplemented with adaptation of further variables.

The overall result is that inaccuracies in measured or modeled variables that are involved in system model 100 are compensated for by the various adaptation operations. From the fact that the modeled value $\lambda_{out,mod}$ corresponds to the measured lambda value $\lambda_{out,meas}$, it can be inferred that the fill level $\overline{\theta}_{mod}$ modeled using system model 100 or using first catalytic converter model 102 corresponds to the fill level, not measurable using onboard means, of three-way catalytic converter 26. It can then further be inferred that the second catalytic converter, which is the inverse of first catalytic converter model 102 and constitutes part of pilot control system 104, correctly describes the behavior of the modeled system.

This can be utilized to calculate a baseline lambda setpoint using the inverse catalytic converter model that constitutes part of pilot control system 104. For that purpose, a fill level setpoint $\overline{\theta}_{set,flt}$ that has been filtered through an optional filter 120 is delivered as an input variable to pilot control system 104. Filter 120 is applied so as to permit only those changes to the input variable of pilot control system 104 which the controlled system as a whole can follow. An as yet unfiltered setpoint $\overline{\theta}_{set}$ is read out from a memory 118 of control device 16, memory 118 preferably being addressed for that purpose with current operating parameters of internal combustion engine 10. The operating parameters are, for example but not obligatorily, the engine speed detected by engine speed sensor 25 and the load, detected by air mass sensor 18, on internal combustion engine 10.

In pilot control block 104, on the one hand a pilot control lambda value is determined as baseline lambda setpoint BLS, and on the other hand a target fill level trajectory is determined as a function of the filtered fill level setpoint. Concurrently with this determination, in a combining function 122 a fill level system deviation FLSD is calculated as the deviation of the fill level $\overline{\theta}_{mod}$, modeled with system model 100 or with first catalytic converter model 102, from the filtered fill level setpoint $\overline{\theta}_{set,flt}$ or from the target fill level trajectory. This fill level system deviation FLSD is delivered to a fill level regulation algorithm 124 that calculates therefrom a lambda setpoint correction value LSCV. This lambda setpoint correction value LSCV is added, in combining function 126, to the baseline lambda setpoint BLS calculated by pilot control system 104.

The sum thereby calculated can serve as a setpoint $\lambda_{in,set}$ for a conventional lambda regulating system. The actual lambda value $\lambda_{in,meas}$ furnished by first exhaust gas probe 32 is subtracted from this lambda setpoint $\lambda_{in,set}$ in a combining function 128. The system deviation SD thereby calculated is converted by a usual regulation algorithm 130 into a control variable CV that, in a combining function 132, is combined, for instance by multiplication, with a baseline value BV, predetermined as a function of operating parameters of internal combustion engine 10, of an injection pulse width $t_{inj}$. Baseline values BV are stored in a memory 134 of control device 16. Here as well, the operating parameters are preferably, but not obligatorily, the load and engine speed of internal combustion engine 10. Control is applied to injection valves 22 using the injection pulse width $t_{inj}$ resulting from the product.

In this manner, the conventional lambda regulation occurring in a first control loop is overlain by a regulation of the oxygen fill level of catalytic converter 26 which occurs in a second control loop. The average oxygen fill level $\overline{\theta}_{mod}$ modeled with the aid of system model 100 is adjusted, for instance, to a setpoint $\overline{\theta}_{set,flt}$ that minimizes the probability of breakouts toward lean and rich and thereby results in minimal emissions. Because the baseline lambda setpoint BLS is calculated by the inverted second system model of pilot control system 104, the system deviation of the fill level regulation system is equal to zero when the modeled average fill level $\overline{\theta}_{mod}$ is identical to the prefiltered target fill level $\overline{\theta}_{set,flt}$. The implementation of pilot control system 104 as an inversion of system model 100 has the advantage that fill level regulation algorithm 124 needs to intervene only if the actual fill level of the catalytic converter, modeled with the aid of the system model, deviates from the filtered fill level setpoint $\overline{\theta}_{set,flt}$ or from the unfiltered fill level setpoint $\overline{\theta}_{set}$.

While system model 100 converts the input lambda before the catalytic converter into an average oxygen fill level of the catalytic converter, pilot control system 104, implemented as an inverted system model, converts the average target oxygen fill level into a corresponding target lambda before the catalytic converter.

Pilot control system 104 encompasses a numerically inverted calculation model that is based on a first system model 100, assumed to be known, for catalytic converter 26. Pilot control system 104 encompasses in particular a second system model whose system of equations is identical to the system of equations of first system model 100, but which is supplied with different input variables.

Pilot control system 104 furnishes a pilot control lambda value PCLV for lambda regulation, and a target fill level trajectory as a function of the filtered fill level setpoint. For calculation of the pilot control lambda value PCLV, which corresponds to the filtered fill level setpoint, pilot control block 104 contains a calculation model that corresponds to a system model that is the inverse of system model 100, i.e. a model that assigns to a filtered fill level setpoint a baseline lambda setpoint BLS as a preliminary pilot control lambda value. When an appropriate BLS is selected, the desired fill level then results.

The advantage of this procedure is that the system of equations for the forward system model 100 or 100' simply needs to be solved one more time, but the system of equations, solvable only with a large calculation outlay or not at all, for the reverse system model of pilot control system of FIG. 3 does not need to be solved.

The system of equations that is to be solved is solved iteratively using inclusion methods such as bisection methods or regula falsi, in which context the baseline lambda setpoint is iteratively modified. Inclusion methods such as regula falsi are conventional. They are notable for the fact that they not only supply iterative approximate values, but also limit them from both sides. The calculation outlay for determining the correct baseline lambda setpoint BLS is thereby considerably limited.

In order to minimize the calculation outlay in control device 16, it is preferable to define iteration limits which specify the range in which the iteration is carried out. These iteration limits are preferably defined as a function of the current operating conditions. It is advantageous, for instance, to perform the iteration only in the smallest possible range around the expected target lambda BLS. It is also advantageous, when defining the iteration limits, to take into consideration the action of fill level regulation system 124, and actions of other functionalities, on the target lambda BLS.

All the elements depicted in FIG. 3, with the exception of exhaust system 26, exhaust gas probes 32, 34, air mass sensor 18, rotation angle sensor 25, and injection valves 22, are constituents of a control device 16 according to the present invention. With the exception of memories 118, 134, all the other elements in FIG. 3 are part of engine control program 16.1, which is stored in control device 16 and executes therein.

Elements 22, 32, 128, 130, and 132 constitute a first control loop in which a lambda regulation function is performed in which the signal $\lambda_{in,meas}$ of first exhaust gas probe 32 is processed as an actual lambda value. The lambda setpoint $\lambda_{in,set}$ of the first control loop is calculated in the second control loop, which encompasses elements 22, 32, 100, 122, 124, 126, 128, 132.

As has already been described earlier with reference to FIG. 3, a third adaptation path 200 proceeding from adaptation block 114 leads to pilot control system 104. By way of third adaptation path 200, a continuous adaptation occurs which is based on average signal values of output-side exhaust gas probe 34.

With these average signal values, the signal of output-side exhaust gas probe 34 accurately indicates the lambda value of the exhaust gas. When an offset $\Delta\lambda_{offs}$ occurs in the lambda control loop, which can be the case due to a fault in input-side exhaust gas probe 32 or a delivery of leakage air to the exhaust gas occurring between the two exhaust gas probes, the signal of output-side exhaust gas probe 34 lying in the range of average signal values will indicate said offset $\Delta\lambda_{offs}$ as a deviation from an expected value. The deviation is ascertained in block 114, for instance, as a difference between a signal value and an expected value, and is incorporated additively into the lambda setpoint in pilot control system 104. This can be accomplished, for instance, by the fact that the lambda offset value $\Delta\lambda_{offs}$ is added to a provision pilot control lambda value.

An adaptation requirement exists when the two values (signal value and expected value) differ, in particular differ by more than a predefined threshold value. It is advantageous to correct the target lambda value for the input-side lambda value, and the ascertained target fill level trajectory, using a lambda offset value that represents an indicator of an adaptation requirement. This indicator of the adaptation requirement derives from the difference between the output-side lambda value modeled with the aid of the system model and the measured output-side lambda value, in particular as their difference constituting a lambda offset value.

Thanks to the correction of the target lambda value for the input-side lambda value, the lambda regulation system can react immediately to changes in the lambda offset value.

Because the system model is adapted, the modeled average fill level does deviate from the actual fill level, but because the target fill level setpoint trajectory is also adapted, it tracks the incorrect modeled fill level of the system model, so that the fill level control system sees the same system deviation before and after adaptation. Discontinuities in the system deviation, which could result in an excursion by the fill level regulation system, are thereby avoided.

It is advantageous to smooth the indicator of the adaptation requirement, i.e. a difference between the modeled output-side lambda value and the measured output-side lambda value, with the aid of a filter in an adaptation block in order to obtain the lambda offset value. The filter can be embodied, for example, as a PT1 filter and can have an operating point-dependent time constant that can be taken, for instance, from a corresponding parameterizable characteristics diagram. The filter can optionally be followed by an integrator in order to take long-term effects into consideration. In the stabilized state, the filtered signal corresponds exactly to the adaptation requirement.

It is furthermore useful to store the adaptation value at the end of a driving cycle and to use the corresponding adaptation value as an initial value in a subsequent driving cycle.

In an embodiment, a fourth adaptation path 230 is additionally present as an option. The fourth adaptation path leads from adaptation block 114 to a block 240 in which an actual lambda value of input-side exhaust gas probe 32 is combined additively with the lambda offset value.

The adaptation that occurs continuously on the lambda level should, usefully, sooner or later result in a correction at the point at which the lambda offset has its origin. As a rule this will be at input-side exhaust gas probe 32. It is therefore advantageous to correct the measured signal $\lambda_{in,meas}$ of the input-side exhaust gas probe 32 using the signal $\Delta\lambda_{offs}$. In FIG. 3, this occurs in block 240. To ensure that this does not produce a double correction in the pilot control system and in block 240, a handshake between blocks 240 and adaptation block 114 is advantageous. The handshake occurs, for instance, via a handshake path 250, in such a way that the correction signal for the pilot control system block 104 is decreased by the amount that is combined, in block 240, with the actual value of the signal of input-side exhaust gas probe 32. For this, for instance, one of the two corrections can be multiplied by a factor x, where 0<x<1, if the other of the two corrections is multiplied by a factor (1-x).

What is claimed is:

1. A method for an internal combustion engine having a catalytic converter that includes a reservoir, the method comprising the following steps:
    determining a current value of a fill level of the reservoir with an exhaust gas component by applying received sensor signals to a system model;
    measuring, during operation of the internal combustion engine, an actual current maximum storage capacity of the catalytic converter for the exhaust gas component; and
    controlling the internal combustion engine based on the determined current value of the fill level to regulate the fill level towards a setpoint value of the fill level;
    wherein one or both of the following:
        the determining of the current value of the fill level is further based on the measured actual current maximum storage capacity; and the controlling of the fill level is further based on the measured actual current maximum storage capacity besides for the determined current value of the fill level.

2. The method as recited in claim 1, wherein the measurement of the actual current maximum storage capacity of the catalytic converter for the exhaust gas component is performed based on a determination that predetermined operating conditions, under which a reliable measurement result is to be expected, are present.

3. The method as recited in claim 1, wherein the exhaust gas component is oxygen.

4. The method as recited in claim 1, wherein the measurement of the actual current maximum storage capacity of the catalytic converter for the exhaust gas component is performed based on a determination of presence of a predetermined operating state of the internal combustion engine (a) that follows a coasting phase with fuel shutoff, and (b) in which an oxygen fill in the reservoir which occurred in the coasting phase is cleared by an input of exhaust gas that exhibits an oxygen deficiency.

5. The method as recited in claim 4, wherein the predetermined operating state, on whose determined presence the measurement of the actual current maximum storage capacity of the catalytic converter for the exhaust gas component is performed, is an operating state in which operating parameters, with which an adaptive characteristics diagram that is used to control the internal combustion engine is addressable, are limited to predetermined change ranges that are associated with predetermined values of a modeled maximum storage capacity.

6. The method as recited in claim 5, wherein the operating parameters are an average catalytic converter temperature and an exhaust gas mass flow.

7. The method as recited in claim 4, wherein an expected oxygen discharge from the reservoir from a beginning of clearance until attainment of a setpoint for the reservoir fill, and an oxygen discharge from the beginning of clearance until a reaction by an exhaust gas probe disposed in the exhaust gas flow downstream from the catalytic converter, are determined, the expected oxygen discharge and the oxygen discharge are correlated, and an indicator of an adaptation requirement of a modeled maximum storage capacity in that operating state is determined from the correlation.

8. The method as recited in claim 7, wherein the indicator of the adaptation requirement is determined as twice the modeled maximum storage capacity when the oxygen discharge until the signal of a lambda probe after the catalytic converter changes from lean to lambda=1 is twice as high as the expected oxygen discharge until the modeled fill level reaches a steady-state setpoint.

9. The method as recited in claim 7, wherein the indicator of the adaptation requirement is determined as half the modeled maximum oxygen storage capacity when the oxygen discharge until the signal of a lambda probe after the catalytic converter changes from lean to lambda=1 is half as high as the expected oxygen discharge until the modeled fill level would reach the steady-state setpoint.

10. The method as recited in claim 9, wherein the adaptation requirement is a value, stored in a characteristics diagram for a determined operating point that is defined by associated change ranges of operating parameters, for the maximum modeled storage capacity of the catalytic converter, and the value is overwritten by a new value for that operating point when the new value has been ascertained.

11. The method as recited in claim 4, wherein the predetermined operating state, on whose determined presence the measurement of the actual current maximum storage capacity of the catalytic converter for the exhaust gas component is performed, is a coasting phase with fuel shutoff, during which a filling of the reservoir occurs by admission of oxygen.

12. The method as recited in claim 1, wherein the determining of the current value of the fill level is based on the measured actual current maximum storage capacity.

13. The method as recited in claim 12, wherein the controlling of the fill level is also based on the measured actual current maximum storage capacity besides for the determined current value of the fill level.

14. The method as recited in claim 1, wherein the controlling of the fill level is based on the measured actual current maximum storage capacity besides for the determined current value of the fill level.

15. A control device for an internal combustion engine having a catalytic converter that includes a reservoir, the control device comprising a processor programmed with a program that, when executed by the processor, causes the processor to:
   determine a current value of a fill level of the reservoir with an exhaust gas component by applying received sensor signals to a system model;
   obtain, during operation of the internal combustion engine, an actual current maximum storage capacity of the catalytic converter for the exhaust gas component; and
   control the internal combustion engine based on the determined current value of the fill level to regulate the fill level towards a setpoint value of the fill level;
   wherein one or both of the following:
      the determination of the current value of the fill level is further based on the measured actual current maximum storage capacity; and
      the control of the fill level is further based on the measured actual current maximum storage capacity besides for the determined current value of the fill level.

16. The control device as recited in claim 15, wherein the program, when executed by the processor, causes the processor to obtain the measurement of the actual current maximum storage capacity of the catalytic converter for the exhaust gas component based on a determination of presence of a predetermined operating state of the internal combustion engine (a) that follows a coasting phase with fuel shutoff, and (b) in which an oxygen fill in the reservoir which occurred in the coasting phase is cleared by an input of exhaust gas that exhibits an oxygen deficiency.

* * * * *